US010041176B2

(12) United States Patent
He et al.

(10) Patent No.: US 10,041,176 B2
(45) Date of Patent: *Aug. 7, 2018

(54) NO-RINSE PRETREATMENT METHODS AND COMPOSITIONS

(75) Inventors: Lingyun He, Niskayuna, NY (US); Donald W. Whisenhunt, Jr., Niskayuna, NY (US); Jeffrey I. Melzer, Lansdale, PA (US); Andrea Keys Eodice, Manville, NJ (US); Bret Chisholm, West Fargo, ND (US); Christopher M. Carter, Schenectady, NY (US); Shiu-Chin H Su, Croton-on-Hudson, NY (US); Kendall L. Guyer, Carmel, NY (US); Matthew M. Hunter, Langhorne, PA (US)

(73) Assignee: Momentive Performance Materials Inc., Waterford, NY (US)

(*) Notice: Subject to any disclaimer, the term of this patent is extended or adjusted under 35 U.S.C. 154(b) by 2164 days.

This patent is subject to a terminal disclaimer.

(21) Appl. No.: 11/290,064

(22) Filed: Nov. 30, 2005

(65) Prior Publication Data

US 2006/0228470 A1 Oct. 12, 2006

Related U.S. Application Data

(60) Provisional application No. 60/669,123, filed on Apr. 7, 2005.

(51) Int. Cl.
| | | |
|---|---|---|
| *C01B 33/20* | (2006.01) | |
| *C23C 22/48* | (2006.01) | |
| *C09D 5/08* | (2006.01) | |
| *C23C 22/50* | (2006.01) | |
| *C23C 22/56* | (2006.01) | |
| *C23C 22/74* | (2006.01) | |
| *C23C 22/78* | (2006.01) | |

(52) U.S. Cl.
CPC .............. *C23C 22/48* (2013.01); *C09D 5/084* (2013.01); *C09D 5/086* (2013.01); *C23C 22/50* (2013.01); *C23C 22/56* (2013.01); *C23C 22/74* (2013.01); *C23C 22/78* (2013.01); *C23C 2222/20* (2013.01)

(58) Field of Classification Search
CPC ......... C23C 22/48; C23C 22/50; C23C 22/74; C23C 22/78; C09D 5/084; C09D 5/086
USPC ...................................... 427/387, 409, 388.1
See application file for complete search history.

(56) References Cited

U.S. PATENT DOCUMENTS

| | | |
|---|---|---|
| 4,042,749 A | 8/1977 | Sandvig |
| 4,075,153 A | 2/1978 | Leo |
| 4,171,297 A | 10/1979 | Hosaka et al. |
| 4,311,738 A | 1/1982 | Chi |
| 4,379,196 A | 4/1983 | Halper |
| 4,411,964 A | 10/1983 | Hara et al. |
| 4,465,846 A | 8/1984 | Bremer |
| 4,495,247 A | 1/1985 | Vasta |
| 4,514,315 A | 4/1985 | Matulewicz et al. |
| 4,579,752 A | 4/1986 | Dubois et al. |
| 4,618,688 A | 10/1986 | DePasquale et al. |
| 4,775,600 A | 10/1988 | Adaniya et al. |
| 4,799,963 A * | 1/1989 | Basil et al. ............... 106/287.13 |
| 4,889,775 A | 12/1989 | Adaniya et al. |
| 5,035,745 A | 7/1991 | Lin et al. |
| 5,049,596 A | 9/1991 | Fujimoto et al. |
| 5,108,793 A | 4/1992 | Ooij et al. |
| 5,141,575 A | 8/1992 | Yoshitake et al. |
| 5,164,003 A | 11/1992 | Bosco et al. |
| 5,192,374 A | 3/1993 | Kindler |
| 5,194,138 A | 3/1993 | Mansfeld et al. |
| 5,200,275 A | 4/1993 | van Ooij et al. |
| 5,206,285 A | 4/1993 | Castellucci |
| 5,209,788 A | 5/1993 | McMillen et al. |
| 5,221,371 A | 6/1993 | Miller |
| 5,258,522 A | 11/1993 | Tsuchida et al. |
| 5,270,428 A | 12/1993 | Castellucci |
| 5,292,549 A | 3/1994 | van Ooij et al. |
| 5,319,040 A | 6/1994 | Wenprovius et al. |
| 5,322,713 A | 6/1994 | van Ooij et al. |
| 5,324,806 A | 6/1994 | Wengrovius et al. |
| 5,326,594 A | 7/1994 | Sabata et al. |
| 5,336,748 A | 8/1994 | Castellucci |
| 5,344,712 A | 9/1994 | Basil et al. |
| 5,356,492 A | 10/1994 | Miller |
| 5,362,335 A | 11/1994 | Rungta |
| 5,366,567 A | 11/1994 | Ogino et al. |
| 5,393,353 A | 2/1995 | Bishop |

(Continued)

FOREIGN PATENT DOCUMENTS

| | | |
|---|---|---|
| CN | 1332213 | 1/2002 |
| CN | 1353744 | 6/2002 |

(Continued)

OTHER PUBLICATIONS

S.L. Su, K.L. Guyer and A.S. Borovik, "Water-Borne Silane Conversion Coating for Replacement of Phosphate/Chromate Pretreatments", GE Advanced Materials, 7 pages.
R. Zandi-zand, A. Erchad-langroudi, A. Rahimi, "Silica Based Organic-Inorganic Hybrid Nanocomposite Coatings for Corrosion Protection", Progress in Organic Coatings 53 (2005) 286-291.
Tammy L Metroke, Allen Apblett, "Effect of Solvent Dilution of Corrosion Protective Properties of Ormosil Coatings on 2024-T3 Aluminum Alloy", Progress in Organic Coatings 51 (2004) 36-46.
M.F. Montemor, A.M. Simoes, M.G.S. Ferreira, "Composition and Corrosion Behaviour of Galvanised Steel Treated with Rare-Earth Salts: The Effect of the Cation", Progress in Organic Coatings 44 (2002) 111-120.

(Continued)

*Primary Examiner* — Hannah J Pak
(74) *Attorney, Agent, or Firm* — James C. Abruzzo

(57) ABSTRACT

Conversion and passivation coatings and methods for metal surfaces such as steel and aluminum are disclosed. The coating compositions comprise an aqueous sol of cerium oxide and/or silica particles and a ureido silane compound. The methods of the invention comprise contacting the requisite metal surface with the coating composition.

17 Claims, No Drawings

(56) References Cited

U.S. PATENT DOCUMENTS

| | | |
|---|---|---|
| 5,399,210 A | 3/1995 | Miller |
| 5,419,790 A | 5/1995 | Miller |
| 5,426,131 A | 6/1995 | Katsamberis |
| 5,433,976 A | 7/1995 | van Ooij et al. |
| 5,437,937 A | 8/1995 | Cayless |
| 5,451,431 A | 9/1995 | Purnell et al. |
| 5,476,896 A | 12/1995 | Pereira et al. |
| 5,478,655 A | 12/1995 | Sabata et al. |
| 5,531,820 A | 7/1996 | Gorecki |
| 5,548,053 A | 8/1996 | Weidner et al. |
| 5,658,976 A | 8/1997 | Carpenter et al. |
| 5,668,212 A | 9/1997 | Naito |
| 5,708,048 A | 1/1998 | Medford et al. |
| 5,730,246 A | 3/1998 | Beard |
| 5,750,197 A | 5/1998 | van Ooij et al. |
| 5,756,218 A | 5/1998 | Buchheit et al. |
| 5,759,629 A | 6/1998 | van Ooij et al. |
| 5,796,117 A | 8/1998 | Larson et al. |
| 5,814,137 A | 9/1998 | Blohowiak et al. |
| 5,817,160 A | 10/1998 | Nagpal et al. |
| 5,846,342 A | 12/1998 | Aoyama et al. |
| 5,866,652 A | 2/1999 | Hager et al. |
| 5,868,819 A | 2/1999 | Guhde et al. |
| 5,869,141 A | 2/1999 | Blohowiak et al. |
| 5,879,437 A | 3/1999 | Hartman |
| 5,916,355 A | 6/1999 | Willis et al. |
| 5,938,861 A | 8/1999 | Inoue et al. |
| 5,964,928 A | 10/1999 | Tomlinson |
| 5,990,188 A | 11/1999 | Patel et al. |
| 6,071,566 A | 6/2000 | Brown et al. |
| 6,077,885 A | 6/2000 | Hager et al. |
| 6,106,901 A | 8/2000 | Song et al. |
| 6,126,997 A | 10/2000 | Rivera et al. |
| 6,132,808 A | 10/2000 | Brown et al. |
| 6,162,498 A | 12/2000 | Mennig et al. |
| 6,162,547 A | 12/2000 | van Ooij et al. |
| 6,180,177 B1 | 1/2001 | Nagashima et al. |
| 6,180,696 B1 | 1/2001 | Wong et al. |
| 6,214,473 B1 | 4/2001 | Hunt et al. |
| 6,215,011 B1 | 4/2001 | Bishop |
| 6,224,944 B1 | 5/2001 | Tokarz et al. |
| 6,251,989 B1 | 6/2001 | Edelmann et al. |
| 6,261,638 B1 | 7/2001 | van Ooij et al. |
| 6,270,884 B1 | 8/2001 | Guhde et al. |
| 6,281,275 B1 | 8/2001 | Sanduja et al. |
| 6,312,812 B1 | 11/2001 | Hauser et al. |
| 6,361,592 B1 | 3/2002 | Song et al. |
| 6,395,856 B1 | 5/2002 | Petty et al. |
| 6,403,164 B1 | 6/2002 | Jonschker et al. |
| 6,406,652 B1 | 6/2002 | Protz et al. |
| 6,416,869 B1 | 7/2002 | van Ooij et al. |
| 6,416,870 B1 | 7/2002 | Hunt et al. |
| 6,432,191 B2 | 8/2002 | Schutt |
| 6,440,541 B1 | 8/2002 | Humphrey et al. |
| 6,447,589 B2 | 9/2002 | Sasaki et al. |
| 6,451,382 B2 | 9/2002 | Schutt et al. |
| 6,451,443 B1 | 9/2002 | Daech |
| 6,461,682 B1 | 10/2002 | Crotty et al. |
| 6,478,886 B1 | 11/2002 | Kunz et al. |
| 6,482,274 B2 | 11/2002 | Shimakura et al. |
| 6,500,276 B1 | 12/2002 | Minevski et al. |
| 6,503,565 B1 | 1/2003 | Hughes et al. |
| 6,506,314 B1 | 1/2003 | Whitney, Jr. et al. |
| 6,528,468 B2 | 3/2003 | Matsukawa et al. |
| 6,534,568 B1 | 3/2003 | Katz et al. |
| 6,562,474 B1 | 5/2003 | Yoshimi et al. |
| 6,579,472 B2 | 6/2003 | Chung et al. |
| 6,596,835 B1 | 7/2003 | Brown et al. |
| 6,638,369 B1 | 10/2003 | Tucker et al. |
| 6,695,904 B2 | 2/2004 | Burger et al. |
| 6,827,981 B2 | 12/2004 | van Ooij et al. |
| 6,875,479 B2 | 4/2005 | Jung et al. |
| 6,953,821 B2 * | 10/2005 | Tamori et al. ............... 524/457 |
| 7,202,309 B2 | 4/2007 | Furrer et al. |
| 8,609,755 B2 | 12/2013 | Su et al. |
| 2002/0084002 A1 | 7/2002 | Hardin et al. |
| 2002/0096230 A1 | 7/2002 | Hardin et al. |
| 2003/0026912 A1 | 2/2003 | Ostrovsky |
| 2003/0027011 A1 | 2/2003 | Kotov et al. |
| 2003/0041779 A1 | 3/2003 | Burger |
| 2003/0049486 A1 | 3/2003 | Van Ooij et al. |
| 2003/0165627 A1 * | 9/2003 | Heimann et al. ............. 427/402 |
| 2004/0009300 A1 | 1/2004 | Shimakura et al. |
| 2004/0018367 A1 | 1/2004 | Jaworek et al. |
| 2004/0062873 A1 | 4/2004 | Jung et al. |
| 2004/0134339 A1 | 6/2004 | Wang et al. |
| 2004/0139887 A1 | 7/2004 | Zhang |
| 2005/0059783 A1 | 3/2005 | Furrer et al. |
| 2005/0079364 A1 | 4/2005 | Van Ooij et al. |
| 2005/0084616 A1 | 4/2005 | Rivera et al. |
| 2005/0131106 A1 | 6/2005 | Tonapi et al. |
| 2005/0179010 A1 | 8/2005 | Lin |
| 2006/0009549 A1 | 1/2006 | Legters et al. |
| 2006/0036034 A1 | 2/2006 | Chaves et al. |
| 2006/0042509 A1 | 3/2006 | Henglein et al. |
| 2006/0070551 A1 | 4/2006 | Kanamori et al. |
| 2006/0090818 A1 | 5/2006 | Carey |
| 2006/0127681 A1 | 6/2006 | Domes et al. |
| 2006/0134339 A1 | 6/2006 | Wang et al. |
| 2006/0147674 A1 | 7/2006 | Walker |
| 2006/0167154 A1 | 7/2006 | Bousseau et al. |
| 2006/0177657 A1 | 8/2006 | Weller |
| 2006/0228470 A1 | 10/2006 | He et al. |
| 2009/0032140 A1 * | 2/2009 | Carey et al. ................... 148/26 |
| 2010/0178521 A1 | 7/2010 | Byrne et al. |
| 2011/0086173 A1 | 4/2011 | Walter et al. |

FOREIGN PATENT DOCUMENTS

| | | |
|---|---|---|
| CN | 1530462 | 9/2004 |
| DE | 198 13 709 | 9/1999 |
| DE | 198 14 605 | 10/1999 |
| EP | 0089810 | 9/1983 |
| EP | 0157044 | 10/1985 |
| EP | 0263428 | 4/1988 |
| EP | 0337075 | 10/1989 |
| EP | 0358338 | 3/1990 |
| EP | 0367504 | 5/1990 |
| EP | 0385736 A2 | 9/1990 |
| EP | 0465918 | 1/1992 |
| EP | 0486778 | 5/1992 |
| EP | 0601400 | 6/1994 |
| EP | 1130132 | 9/2001 |
| EP | 1130132 A2 | 9/2001 |
| GB | 1342893 | 1/1974 |
| JP | 57128752 | 8/1982 |
| JP | 05-209088 A | 8/1993 |
| JP | 2000-290536 | 10/2000 |
| JP | 04-352699 A | 12/2004 |
| JP | 2006519307 | 8/2006 |
| WO | WO 88/06639 | 9/1988 |
| WO | WO 91/14662 | 10/1991 |
| WO | WO 95/08008 | 3/1995 |
| WO | WO 96/11290 | 4/1996 |
| WO | WO 99/14399 | 3/1999 |
| WO | WO 00/39177 | 7/2000 |
| WO | WO 00/39356 | 7/2000 |
| WO | 0046311 A1 | 8/2000 |
| WO | WO 00/46310 | 8/2000 |
| WO | WO 00/46311 | 8/2000 |
| WO | WO 00/46312 | 8/2000 |
| WO | WO 00/63303 | 10/2000 |
| WO | WO 00/63462 | 10/2000 |
| WO | WO 01/05520 | 1/2001 |
| WO | WO 01/06036 | 1/2001 |
| WO | WO 01/07679 | 2/2001 |
| WO | WO 01/36331 | 5/2001 |
| WO | WO 01/38225 | 5/2001 |
| WO | WO2001/98403 A2 | 5/2001 |
| WO | WO 01/46495 | 6/2001 |
| WO | WO2001/046320 A1 | 6/2001 |
| WO | WO 01/55029 | 8/2001 |
| WO | WO 02/14586 | 2/2002 |
| WO | WO 02/31063 | 4/2002 |

(56) References Cited

FOREIGN PATENT DOCUMENTS

| WO | WO2004/018579 A1 | 3/2004 |
|----|------------------|--------|
| WO | 2004076717 | 9/2004 |
| WO | WO 2004/076718 | 9/2004 |
| WO | WO2004076568 | 9/2004 |
| WO | WO2004076568 A1 | 9/2004 |
| WO | WO2004076718 | 9/2004 |
| WO | WO2005/021647 A1 | 3/2005 |
| WO | WO 2006/110328 | 10/2006 |

OTHER PUBLICATIONS

Dangling Zhu, Wim J. van Ooij, "Corrosion Protection of Metals by Water-Based Silane Mixtures of Bis-[Trimethoxysilylpropyl]amine and vinyltriacetoxysilane", Progress in Organic Coatings 49 (2004) 42-53.

Vignesh Palanivel, Danoing Zhu, Wim J. van Ooij, "Nanoparticle-Filled Silane Films as Chromate Replacements for Aluminum Alloys", Progress in Organic Coatings 47 (2003) 384-392.

U.S. Appl. No. 10/660,916, filed Sep. 2003, Furrer et al.

\* cited by examiner

NO-RINSE PRETREATMENT METHODS AND COMPOSITIONS

CROSS REFERENCE TO RELATED APPLICATION

This application claims the priority benefit of U.S. Provisional Patent Application Ser. No. 60/669,123 filed Apr. 7, 2005.

FIELD OF INVENTION

The invention relates to non-chromium containing coatings for metals. Particularly, the invention relates to a no-rinse, non-chromate, non-metal phosphate coating for steel, zinc coated steel, and aluminum surfaces comprising a stabilizing agent to improve the adhesion of siccative coatings to the surface and provide enhanced corrosion protection.

BACKGROUND OF THE INVENTION

A variety of compositions are known for commercial applications to prepare metal surfaces. For example, chromium and heavy metal phosphate conversion coatings are used in commercial applications to prepare metal surfaces prior to painting operations. However, growing concerns exist regarding the toxicity profile of chromium and the pollution effects of chromates, phosphates, and other heavy metals discharged into rivers and waterways from the waste streams of these industrial processes.

Accordingly, there is a need in the art to provide an effective treatment to provide dried in place conversion or passivation coating to inhibit metal surface corrosion and enhance adhesion of paint on or other coatings that may be applied to the surface.

SUMMARY OF THE INVENTION

The present invention pertains to a method and composition for treating the surfaces of a metal such as steel, zinc coated steels, and aluminum, to provide for the formation of a conversion or passivating coating which increases the corrosion resistance of bare or painted metal and/or the adhesion properties of the metal. The methods of the invention comprise contacting the requisite metal surface with a stabilized, aqueous sol comprising colloidal oxide particles such as metal oxide or silica particles and a ureido silane compound. After contact of the metal surface with the above treatment, the treatment may be dried in place to form the desired coating. Preferably, the treatment is substantially free of chromium and phosphate.

DETAILED DESCRIPTION OF EXEMPLARY EMBODIMENTS

In accordance with the invention, it has been discovered that chrome-free, and preferably phosphate free, conversion or passivation coatings can be provided on metal surfaces such as electrogalvanized steel, cold rolled steel, hot dip galvanized steel, aluminum, and other metals by contacting the desired surface with a stabilized aqueous sol containing a colloidal oxide containing sol such as a metal oxide sol or a silica sol. Preferably, the sols include either silica and/or cerium oxide particles. The sol compositions further comprise one or more hydrolyzed or partially hydrolyzed ureido silanes. In a preferred aspect of the invention, stabilizing agents is/are added to the sol-silane mixture to enhance product stability and shelf life. Aqueous pretreatment compositions of the invention provide improved corrosion resistance of bare and painted metal, and adhesion of applied coatings to painted metal. In the context of the invention, the term "bare metal" refers to metal surfaces that are treated with the conversion or passivation coating of the invention but which have not been painted.

The silica sol material comprises aqueous colloidal silica preferably with acidic pH. Exemplary silica sol materials may be purchased from Cabot Corporation and from other suppliers such as Wacker Chemie, Degussa, Nissan Chemical, and Nalco Chemical Company. An example of an effective silica sol, Cab-O-Sperse A205, is an aqueous dispersion of high purity fumed silica in a deionized water. This sol has a pH of about 5-7 and a solids content of about 12%. The viscosity is <100 cPs and the specific gravity is about 1.07.

Exemplary cerium oxide sols are also commercially available. Generally, these comprise cerium oxide particles in aqueous colloidal suspension. Commercially available cerium oxide sols that may be mentioned as exemplary include colloidal cerium oxide nitrate and cerium oxide acetate, both available from Rhodia and those available from Nyacol Nano Technologies Inc. The preferred cerium oxide acetate sol includes about 20% cerium oxide particles. Exemplary Cerium oxide sols includes those having particle sizes of less than about 100 nm. Exemplary pHs are on the order of about 1-9. Other metal oxide sols such as ZnO, $ZrO_2$, $TiO_2$ and $Al_2O_3$ may also be mentioned.

As to the ureido silane materials that are present, these include ureido silanes as set forth in Formula I.

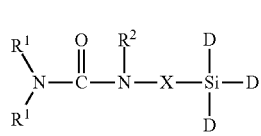

I or the hydrolyzates or condensates of such silane wherein D is independently chosen from ($R^3$) or (OR) with the proviso that at least one D is (OR). In the formula, each R is independently chosen from the group consisting of hydrogen, alkyl, alkoxy-substituted alkyl, acyl, alkylsilyl or alkoxysilyl and each R group can be linear or branched and may be the same or different. Preferably, R is individually chosen from the group consisting of hydrogen, ethyl, methyl, propyl, iso-propyl, butyl, iso-butyl, see-butyl, and acetyl.

X in Formula I is a member selected from the group consisting of a bond, or a substituted or unsubstituted aliphatic or aromatic group. Preferably, X is selected from members of the group consisting of a bond, $C_1$-$C_{10}$ alkylene, $C_1$-$C_6$ alkenylene, $C_1$-$C_6$ alkylene substituted with at least one amino group, $C_1$-$C_6$ alkenylene substituted with at least one amino group, arylene and alkylarylene.

The $R^1$ and $R^2$ moieties are individually selected from the group consisting of hydrogen, $C_1$-$C_6$ alkyl, cycloalkyl, $C_1$-$C_6$ alkenyl, $C_1$-$C_6$ alkyl substituted with at least one amino group, $C_1$-$C_6$ alkenyl substituted with at least one amino group, arylene and alkylarylene. Preferably, $R^1$ is individually selected from the group consisting of hydrogen, ethyl, methyl, propyl, iso-propyl, butyl, iso-butyl, sec-butyl, ter-butyl, cyclohexyl and acetyl.

As used herein, the term "substituted" aliphatic or aromatic means an aliphatic or aromatic group wherein the carbon backbone may have a heteroatom located within the backbone or a heteroatom or heteroatom containing group attached to the carbon backbone.

$R^3$ of the formula I is a monovalent hydrocarbon group having from 1 to 10 carbon atoms. The $R^3$ group includes alkyl, aryl, and aralkyl groups such as methyl, ethyl, butyl, hexyl, phenyl, benzyl. Of these, the lower $C_1$-$C_4$ alkyls are preferred. Usually $R^3$ is methyl.

The particularly preferred ureido silane employed in the invention is γ-ureidopropyltrimethoxysilane having the structure:

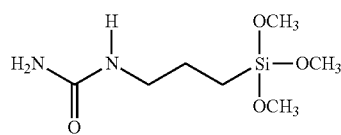 [SMILES: CO[Si](CCCNC(N)=O)(OC)OC]

This compound is commercially available under the designation "Silquest A-1524" from GE Silicones. 3-ureidopropyltriethoxysilane can also be used to prepare the hydrolyzates. Pure 3-ureidopropyltriethyoxysilane is a waxy solid material. A solvent or means of solubilizing the solid is needed for it to be useful. Commercially available 3-ureidopropyltriethoxysilane is dissolved in methanol, and as a result, it is not a pure compound but contains both methoxy and ethoxy groups attached to the same silicon atom. When fully hydrolyzed, the identity of the silanes would be identical.

In addition to the above combination of sol and ureido silanes, we have found that the shelf life of the combination can be markedly improved by addition of a stabilizing agent thereto. Preliminary data suggest that with the addition of certain stabilizers, the shelf life of the sol/ureido silane composition can be extended. A host of stabilizing agents may be mentioned as exemplary. For example, alcohols, glycols, triols, polyols, glycol ethers, esters, ketones, pyrrolidones, and polyethersilanes are exemplary.

Specific stabilizers include: ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols including: propylene glycol, 1,3-butanediol, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol, glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy)ethanol (butyl carbitol), di(propylene glycol)butyl ether, methoxytriglycol (tri(ethylene glycol)monomethyl ether), ethoxytriglycol (tri(ethylene glycol)monoethyl ether), butoxytriglycol (tri(ethylene glycol)monobutyl ether, methoxypolyethylene glycol (poly(ethylene glycol)methyl ether), poly(ethylene glycol)butyl ether, poly(ethylene glycol)dimethylether, poly(ethylene glycol-co-propylene glycol), poly(ethylene glycol-co-propylene glycol)monobutyl ether, poly(propylene glycol)monobutyl ether, di(propylene glycol)dimethylether; esters including methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate (1-methoxy-2-propanol acetate), propylene glycol ethyl ether acetate, and ketones including acetone, methyl ethyl ketone, 2,4-pentane dione, diacetone alcohol and polyether silanes including Silquest A-1230.

Additionally, as an optional adjuvant to the above components, the compositions of the invention may include $C_1$-$C_4$ alkoxylated silane compounds to provide Si—O bonds in the working solutions. These adjuvant compounds can be represented by the formula

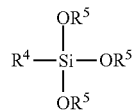

wherein $R^4$ is a monovalent hydrocarbon group having from 1 to 10 carbon atoms or $OR^5$ and each $R^5$ is independently chosen from $C_1$-$C_4$ alkyl. At present, tetraethylorthosilicate (TEOS) or methyltriethoxysilane can be mentioned. This compound and the others encompassed by the formula will hydrolyze in solution to provide a source of Si—O bonds.

At present, exemplary methods of the invention comprise contacting the desired metal surface with an aqueous sol comprising: (a) Si and/or Ce oxide particles, and (b) a ureido silane compound. As stated above, the sol may include a stabilizing agent (c) and the optional adjuvant (d).

Exemplary sol compositions are substantially chromate free and preferably substantially phosphate free and include
(a) 0.001 to 36 wt % colloidal metal oxide or silica sol particles;
(b) 0.01 to 80 wt % ureido silane and hydrolyzate forms thereof;
(c) optional stabilization additive percent in an amount of about 0.00 to 25 wt %; and (d) optional alkoxylated silane compound or hydrolyzate thereof in an amount of about 0.00-25 wt %; remainder predominantly water and minimum amounts of pH adjustment agents. The weight of the composition is, in total, 100 wt %. The pH of the sol compositions may preferably range from about 1-7.

Most preferred are compositions having the following range (in wt %) of the components:
(a) 0.001 to 10 wt % Si and/or Ce oxide particles;
(b) 3 to 60 wt % ureido silane or hydrolyzate form thereof;
(c) 1 to 15 wt % stabilizing agent and (d) 1-15 wt % adjuvant, remainder predominantly water and minor amounts of pH regulating agents.

The requisite metal surface may be contacted by the treatment in spray, immersion, or roller applications. The treatment is dried, and the metal surface is ready for painting or other coating applications.

The conversion or passivation treatment of the invention is applied to the treated surface to result in a conversion coating weight of greater than about 0.5 milligram per square foot of the treated surface with a weight of about 2-500 milligrams per square foot being more preferred. For use in commercial applications, working solutions comprising about 1-100 wt %, preferably 5-70 wt % concentrations of the above formulations are used to contact the desired metal surfaces.

In another embodiment of the invention, hazardous air pollutants such as MeOH are removed from the mixing process in which the ureido silane, and cerium sol are first mixed. After removal of substantial amount of the MeOH or other volatiles formed via this mixing, stabilizing agents and optionally water, are added to the reaction mixture to enhance product stability. The stabilizing agents, especially those with a boiling point above that of water, can also be added before the removal of MeOH.

EXAMPLES

The invention will now be described in conjunction with the following examples which are to be regarded as being illustrative of certain embodiments of the invention but should not be viewed to restrict the invention.

Example 1

The following formulations were evaluated to examine the performance of the colloidal metal oxide silane mixture. Pretreatment solutions were prepared by mixing a silane, colloidal cerium oxide and water (Table 1A).

TABLE 1A

|  | A1 | B1 | C1 | D1 | E1 |
|---|---|---|---|---|---|
| Aminopropyltrimethoxysilane | 5% | 5% | 5% |  |  |
| Ureidopropyltrimethoxysilane |  |  |  | 5% | 5% |
| Colloidal cerium oxide (20%) |  |  | 2% |  | 2% |
| Colloidal silica (34%) |  | 2% |  |  |  |
| Water | 95% | 93% | 93% | 95% | 93% |
| pH | 6 | 6 | 6 | 3 | 3 |

Advanced Coatings Laboratories (ACT) panels were used: cold rolled steel (CRS) and EZ60/60 Electrogalvanized steel (EG). Panels were processed as follows:
Clean—Kleen 182 via immersion at 120° F., 3 minute contact time, (CRS), or 1 minute (EG)
Rinse—DI water flooded over the panel until a water break free surface was obtained
Dry the panel with air at room temperature
Pretreat—immerse panel into the solution for 5 secs. (CRS) and 30 sec. (EG) at RT
Allow treatment solution to drain off of the panel for 30 sec.
Dry—use hot air gun to dry the solution on the panel surface.

Panels were painted with White Polycron III (AG452W3223) from PPG Industries. The paint was applied and cured per the manufacturer's specifications. After painting, the panels were subjected to Neutral Salt Spray Testing (NSS) according to ASTM B-117 for 96 hours and rated for creep from the scribe in millimeters in accordance with ASTM D 1654 (Table 1B). Performance was compared to industry standard iron and zinc phosphate pretreatments.

TABLE 1B

|  | NSS Exposure mm Creep | |
|---|---|---|
| Formulation | EG 96 Hours | CRS 96 Hours |
| A1 | 5 | 5 |
| B1 | 3 | 3 |
| C1 | 5 | 2 |
| D1 | 0.7 | 0.7 |
| E1 | 0.5 | 0.4 |
| Control - Iron phos/chrome seal | 0.6 | 0.5 |
| Control - Zinc phos chrome seal | 0.6 | 0.3 |

Example 2

The following formulations were prepared to compare the performance of a variety of silanes. Pretreatment solutions were prepared by mixing silane, colloidal cerium oxide (20% active and acetate stabilized), colloidal silica, and water (Table 2A). Advanced Coatings Laboratories (ACT) panels were used—cold rolled steel (CRS) and G70/70 Hot dipped galvanized steel (HDG). Panels were processed as follows:
Clean—3% Kleen 132 (commercially available from GEWPT), 130° F., spray applied (10 seconds for HDG, 30 seconds for CRS)
Rinse—5 seconds, tap water
Rinse—5 seconds, DI water
Blow dry to remove water from the surface
Spin application of pretreatments—approximately 30 to 40 mls of pretreatment solution is flooded onto the surface of a panel. Panel is spun so that excess material is removed via centrifugal force. A warm air gun is then used to dry the remaining pretreatment solution onto the metal surface.
Pretreated panels were painted as follows:
HDG—painted with PPG Truform ZT2 Black 3 MB726891
CRS—painted with Akzo Nobel Lighting Fixture White PW8R30708
Paints were applied and cured per manufacturer's specifications.

Painted panels were then subjected to neutral salt spray testing (NSS) per ASTM B117. Panels were then rated for corrosion resistance via measuring the millimeters of creep from a scribe, at the number of hours exposure to salt spray, as indicated via ASTM D1654 (Table 2B).

TABLE 2A

|  | Formulations | | | | | | | |
|---|---|---|---|---|---|---|---|---|
|  | A2 | B2 | C2 | D2 | E2 | F2 | G2 | H2 |
| Wt % CeO$_2$ (20%) | 2 |  | 2 | 2 | 2 | 2 | 2 | 2 |
| Wt % Silquest A-1524 | 2.5 | 2.5 | 1.3 | 1.7 | 1.9 |  |  |  |
| Wt % Cabosperse A205 | 1 | 1 | 1 | 1 | 1 | 1 | 1 | 1 |
| Silquest A-1100 |  |  | 1.3 | 0.9 | 0.7 |  |  |  |
| Silquest A-1637 |  |  |  |  |  | 2.5 |  |  |
| Silquest A-1110 |  |  |  |  |  |  | 2.5 |  |
| Silquest A-186 |  |  |  |  |  |  |  | 2.5 |
| Water | 94.5 | 96.5 | 94.4 | 94.4 | 94.4 | 94.5 | 94.5 | 94.5 |

Note
for samples B through G, acetic acid was added to adjust the pH of the treatment solution to 4.0 to 4.3.
Cabosperse A205 - 12% active colloidal silica
Silquest A-1524 - gamma-ureidopropyltrimethoxysilane
Silquest A-1100 - gamma-aminopropyltriethoxysilane
Silquest A-186 - beta-(3,4-epoxycyclohexyl)ethyltrimethoxysilane
Silquest A-1637 - Delta-aminohexyltrimethoxysilane
Silquest A-1110 - gamma-aminopropyltrimethoxysilane

TABLE 2B

|  | NSS Exposure mm Creep | | | |
|---|---|---|---|---|
| Formulation | HDG 168 Hours | HDG 336 Hours | CRS 168 Hours | CRS 336 Hours |
| A2 | 0.8 | 2.3 | 2.1 | 5.3 |
| B2 | 7.4 | 10.1 | 2.2 | 6.1 |
| C2 | 20+ | NA | 3.85 | NA |
| D2 | 20+ | NA | 4.2 | NA |
| E2 | 20+ | NA | 4.0 | NA |

TABLE 2B-continued

NSS Exposure mm Creep

| Formulation | HDG 168 Hours | HDG 336 Hours | CRS 168 Hours | CRS 336 Hours |
|---|---|---|---|---|
| F2 | 20+ | NA | 8.5 | NA |
| G2 | 20+ | NA | 20+ | NA |
| H2 | 20+ | NA | 20+ | NA |

NA - rating is not available. Panel had been removed from testing at earlier exposure time.

Examples 3 and 4

To demonstrate the ability of the stabilizing agents to improve the stability of the gamma-ureidopropyltrimethoxysilane+colloidal cerium oxide based pretreatment, concentrated solutions were prepared with and without the addition of stabilizing agents and monitored to determine how many days pass until precipitation or gelling of the solution occurs. (Tables 3 and 4).

TABLE 3

Stabilizing Effect of Additives

| Sample | % A-1524 | % $CeO_2$ | Additive | % Additive | Initial | 21 days | 45 days | 3.4 mos. | 6.4 mos. |
|---|---|---|---|---|---|---|---|---|---|
| A3 | 15 | 5 | None | 0 | yellow solution | precipitate* | | | |
| B3 | 15 | 5 | EtOH | 15 | yellow solution | yellow solution | yellow solution | yellow solution | yellow solution |
| C3 | 15 | 5 | EtOH | 10 | yellow solution | yellow solution | slight haze | gel | |
| D3 | 15 | 5 | EtOH | 5 | yellow solution | yellow solution | precipitate* | | |
| E3 | 15 | 5 | Dowanol PM | 5 | yellow solution | yellow solution | milky solution | precipitate* | |
| F3 | 15 | 5 | propylene glycol | 5 | yellow solution | yellow solution | precipitate* | | |
| G3 | 15 | 5 | propylene glycol | 10 | yellow solution | yellow solution | slight haze | slight haze | translucent |

*precipitate with clear liquid on top Dowanol PM is 1-methoxy-2-propanol

Example 4

To expand on the agents that can produce a stable aqueous solution, additional samples were prepared. (Table 4). As in Example 3, solutions were monitored to determine the number of days until precipitation or gelling occurred.

TABLE 4

Effect of Additional Stabilizing Agents

| | % A-1524 | % $CeO_2$ | Additive | % Additive | Initial | 1 day | 17 days | 50 days | 3.5 months | 6 months |
|---|---|---|---|---|---|---|---|---|---|---|
| A4 | 15 | 5 | EtOH | 5 | clear yellow | clear yellow | translucent | precipitate | | |
| B4 | 15 | 5 | EtOH | 10 | clear yellow | clear yellow | translucent | translucent | translucent | opaque solution |
| C4 | 15 | 5 | Acetone | 5 | clear yellow | clear yellow | translucent | translucent | opaque | milky white solution |
| D4 | 15 | 5 | Methyl acetate | 5 | clear yellow | clear yellow | translucent | precipitate | | |
| E4 | 15 | 5 | A-1230 | 5 | clear yellow | clear yellow | clear yellow | clear yellow | clear yellow | clear yellow solution |
| F4 | 15 | 5 | Dowanol PM | 5 | clear yellow | clear yellow | translucent | translucent | precipitate | |
| G4 | 15 | 5 | Dowanol PM | 10 | clear yellow | clear yellow | translucent | translucent | translucent | translucent solution |
| H4 | 15 | 5 | None | 0 | clear yellow | clear yellow | precipitate | | | |
| I4 | 15 | 5 | A-1110 | 5 | milky white | precipitate with clear solution | | | | |
| J4 | 15 | 5 | A-1100 | 5 | milky white | precipitate with milky solution | | | | |
| K4 | 15 | 5 | A-1110 | 1.5 | milky white | white gel | | | | |
| L4 | 15 | 5 | A-1100 | 1.8 | milky white | white gel | | | | |

A-1230 is a polyether silane
A-1110 is gamma-aminopropyltrimethoxysilane
A-1100 is gamma-aminopropyltriethoxysilane
Dowanol PM is predominantly 1-methoxy-2-propanol

Example 5

In order to minimize the presence of hazardous air pollutants and enhance the stability of the $CeO_2$/ureidosilane sols in accordance with the invention, methanol formed from the hydrolysis of γ-ureidopropyltrimethoxysilane was removed. Thus, 150 grams of Silquest A-1524 (γ-ureidopropyltrimethoxysilane), 50 grams of colloidal $CeO_2$ acetate solution (available Rhodia), and 10 grams of Silquest A-1230 (polyether silane) were mixed in a 32 oz. jar for 20 minutes. After mixing, 365 grams of D.I. water was added with stirring followed by addition of 25.4 grams of 2-methyl-2,4-pentanediol (hexylene glycol, HG). Methanol was removed from the reaction mixture at ~40° C. and 150-60 mm Hg followed by sparging with nitrogen at ambient temperature to give 362 grams of a clear yellow solution. This indicates that 238 grams of material, presumably methanol and water was removed. 138 grams of D.I. water, was then added to result in an aqueous solution containing the active ureidopropylsilane compound (equivalent in silane content to a 30% aqueous solution of the γ-ureidopropyltrimethoxysilane), 10% $CeO_2$ (20% solids), and 5% hexylene glycol.

15 grams of 1-methoxy-2-propanol (Dowanol PM) was then added, and this mixture was analyzed and found to contain only 0.3% MeOH. The percent non-volatile content was determined to be 26.8% per ASTM D-2369.

The following formulations were prepared to evaluate the impact of the stabilizing agents on the performance of the colloidal cerium oxide+silane solution.

Example 6

Pretreatment concentrates were prepared by mixing the silane, colloidal cerium oxide, water and additives (Dowanol PM, 2-methyl-1,3-propanediol, 2-methyl-2,4-pentanediol, Silquest A-1230) via the procedure described in Example 5. (Table 6A).

TABLE 6A

|  | 6A | 6B | 6C | 6D | 6E |
|---|---|---|---|---|---|
| Ureidopropyltrimethoxysilane | 30% | 30% | 30% | 30% | 30% |
| Colloidal cerium oxide (20%) | 10% | 10% | 10% | 10% | 10% |
| 2-methyl-1,3-propanediol | 10% |  | 5% |  |  |
| 2-methyl-2,4-pentanediol |  | 10% |  | 10% | 5% |
| Dowanol PM | 3% | 3% | 3% | 3% | 3% |
| Silquest A-1230 |  |  |  | 2% |  |
| Water | 47% | 47% | 52% | 45% | 52% |

ACT Laboratories cold roll steel (CRS) and G70 hot dipped galvanized steel (HDG) and Q panel 3105 alloy aluminum were processed as follows:
Clean—Kleen 132 at 130° F., 5 sec spray for HDG, 30 sec spray for CRS, and 5 sec spray for aluminum
Rinse—DI water, 5 sec
Dry panel with air at room temperature
Pretreat—pretreatment concentrates were diluted with DI water to 10% w/w and applied via reverse roll coating
Dry—use hot air gun to dry the solution on the panel surface Cold rolled steel panels were painted with a lighting fixture white (PW8R30708) from Akzo Nobel Coatings; aluminum panels were painted with a thermosetting white polyester (91101-76441) from the Valspar Corporation; and hot dipped galvanized panels were painted with black Truform ZT2 (3 MB72689I) from PPG Industries. The paint was applied and cured per the manufacturer's specifications. After painting, CRS and HDG panels were subjected to Neutral Salt Spray Testing (NSS) according to ASTM B-117 for 336 hours and 500 hours respectively. Aluminum panels were subjected to Acetic Acid Salt Spray (AASS) according to ASTM B117-97, Appendix I for 500 hours. All panels were then rated for creep from the scribe in millimeters (mm) in accordance with ASTM D 1654 (Tables 6B, C, D).

TABLE 6B

NSS Exposure CRS
mm Creep

| Formulation | CRS 336 Hours |
|---|---|
| 6A | 3.20 |
| 6B | 2.50 |
| 6C | 2.80 |
| 6D | 4.40 |
| 6E | 2.20 |
| Iron phos/chrome seal (Permatreat 2102/Chemseal 7750) | 7.70 |
| Chrome No-Rinse (Permatreat 1510) | 2.2 |
| Multi Metal-Chrome No-Rinse (Permatreat 1500) | 7.9 |

TABLE 6C

NSS Exposure HDG
mm Creep

| Formulation | HDG 500 Hours |
|---|---|
| 6A | 2.65 |
| 6B | 1.08 |
| 6C | 2.93 |
| 6D | 4.60 |
| 6E | 1.65 |
| Zinc phos/chrome seal (Permatreat 2325/Chemseal 7750) | 1.4 |
| Multi metal Chrome No-Rinse (Permatreat 1500) | 2.2 |

TABLE 6D

AASS Exposure Aluminum
mm Creep

| Formulation | Aluminum 500 Hours |
|---|---|
| 6A | 1.25 |
| 6B | 1.58 |
| 6C | 1.25 |
| 6D | 1.15 |
| 6E | 1.25 |
| Multi-metal Chrome No-Rinse (Permatreat 1500) | 0.03 |

While the invention has been described in detail in connection with specific embodiments thereof, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be limited by the foregoing description.

What is claimed is:

1. An aqueous sol-containing coating composition, said coating composition consisting essentially of:
   (a) colloidal cerium oxide particles in an amount of from 0.001 to 36% by total weight of the composition;
   (b) at least one ureido silane having the structure:

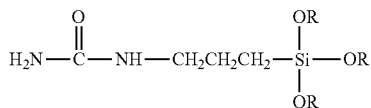

and/or condensation product thereof wherein each R is independently hydrogen or alkyl group of from 1 to 4 carbon atoms, in an amount of from about 0.01 to 80% by total weight of the composition; and,
   (c) water in an amount to provide the remainder of the total weight of the composition
   wherein the coating composition is a conversion or passivation coating composition.

2. The coating composition as recited in claim 1 wherein colloidal cerium oxide particles (a) are selected from the group consisting of colloidal cerium oxide nitrate particles and colloidal cerium oxide acetate particles.

3. The coating composition as recited in claim 1 wherein colloidal cerium oxide particles (a) have a particle size of less than 100 nm.

4. The coating composition as recited in claim 1 wherein said ureido silane (b) is γ-ureidopropyltrimethoxysilane.

5. The coating composition as recited in claim 1 being substantially free of chromium and phosphate.

6. An aqueous sol-containing coating composition, said composition consisting essentially of:
   (a) colloidal cerium oxide particles in an amount of from 0.001 to 36% by total weight of the composition;
   (b) at least one ureido silane having the structure:

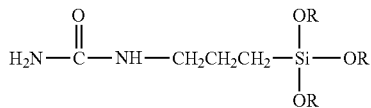

and/or condensation product thereof wherein each R is independently hydrogen or alkyl group of from 1 to 4 carbon atoms, in an amount of from 0.01 to 80% by total weight of the composition;
   (c) stabilizing agent in an amount of from 1 to 20% by total weight of the composition; and,
   (d) water in an amount to provide the remainder of the total weight of the composition;
   wherein the coating composition is a conversion or passivation coating composition.

7. The coating composition as recited in claim 6 wherein stabilizing agent (c) is at least one member selected from the group consisting of glycols, glycol ethers, alcohols and polyether silanes.

8. The coating composition as recited in claim 6 wherein colloidal cerium oxide particles (a) are at least one member selected from the group consisting of colloidal cerium oxide nitrate particles and colloidal cerium oxide acetate particles.

9. The coating composition as recited in claim 6 wherein colloidal cerium oxide particles (a) have a particle size of less than 100 nm.

10. The coating composition as recited in claim 6 wherein said ureido silane (b) is γ-ureidopropyltrimethoxysilane.

11. The coating composition as recited in claim 6 being substantially free of chromium and phosphate.

12. A coated article comprising a metal coated with the coating composition of claim 1.

13. A coated article comprising a metal coated with the coating composition of claim 6.

14. The coated article of claim 12 wherein the metal is steel.

15. The coated article of claim 13 wherein the metal is steel.

16. An aqueous sol-containing composition for treating steel metal surfaces to form a conversion or passivation coating thereon, said composition consisting essentially of:
   (a) colloidal cerium oxide particles selected from the group consisting of colloidal cerium oxide nitrate particles and colloidal cerium oxide acetate particles in an amount of from 0.001 to 10% by total weight of the composition;
   (b) at least one ureido silane having the structure:

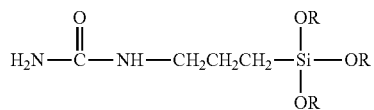

and/or condensation product thereof wherein each R is independently hydrogen or alkyl group of from 1 to 4 carbon atoms, in an amount of from about 0.01 to 60% by total weight of the composition; and,
   (c) water in an amount to provide the remainder of the total weight of the composition.

17. The aqueous sol-containing composition for treating steel metal surfaces to form a conversion or passivation coating thereon of claim 16, wherein the steel metal surfaces are cold rolled steel, electrogalvanized steel or hot dipped galvanized steel.

* * * * *